Patented May 22, 1951

2,554,182

UNITED STATES PATENT OFFICE 2,554,182

PROCESS OF VULCANIZING "GR-S" RUBBER

Arvel O. Franz, Cartersville, Ga., assignor to Chemical Development Co., Cartersville, Ga., a corporation of Georgia No Drawing. Application April 29, 1947, Serial No. 744,779

5 Claims. (Cl. 260—79.5)

This invention relates to an improved process of vulcanizing rubber of the character described in United States Patents 1,873,935 and 1,873,936, Lommel et al., August 23, 1932, Tschunkur et al., 1,938,730 and 1,938,731, December 12, 1933, in the Publication of Rubber Reserve Company of Washington, D. C. entitled "Specifications for Government Synthetic Rubbers," 1945 and in the "India Rubber World" for August 1946, beginning page 680, and popularly described as "GR-S rubber."

The invention is specifically concerned with accelerating the vulcanization process without producing objectionable scorching whereby the rubber may be used in the production milling of the heavier compounds such as are used in tread stocks and mechanical rubber goods. This freedom from scorching persists notwithstanding that a desirable high rate of cure is maintained and, also, there is little tendency to overcure.

The process comprises including in the rubber mix which may include conventional vulcanizing agents, accelerators and activators about .05 to about 1.5 parts of a heavy metal salt of morpholyl dithionic acid, e. g., zinc, iron, lead or copper morpholyl dithionate per 100 parts of the rubbery copolymer. The structural formula of such salts, e. g., the zinc salt, is:

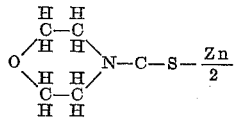

In addition to the above advantages, the physical properties of the vulcanizate are improved in that the modulus of elasticity can be varied from low to high with this accelerator by a suitable choice of conventional softener. For example, if a low modulus is desired, acid softeners may be used while if a high modulus is desired, alkaline softeners can be used, and these properties can be varied by varying the ratios of such softeners.

As one example "standard" GR-S rubber containing 23.5 parts of styrene and 76.5 parts butadiene 1,3, prepared with fatty acid soap and coagulated with salt and acid, after about 72% conversion, and with a viscosity of Mooney 45–55 is mixed with suitable conventional vulcanizing agents, accelerators and activators and zinc morpholyl dithionate, and the mixture vulcanized in the usual manner.

*Example*

| | Parts by weight |
|---|---|
| GR-S | 100 |
| EPC Black | 50 |
| B. R. T. No. 7 (hydrocarbon softener) | 5 |
| Zinc oxide | 5 |
| Sulfur | 2 |
| Zinc morpholyl dithionate | 0.75 |

| Cure Time at 310° F | Tensile Str., lbs./in.² | Elongation, Per Cent | Youngs Modulus of Elasticity at 300% Elongation |
|---|---|---|---|
| 30 min | 3,185 | 580 | 1,320 |
| 50 min | 3,185 | 510 | 1,585 |
| 75 min | 3,245 | 505 | 1,650 |

This material developed no tensile strength when held for 60 minutes at 230° F., indicating safety in processing.

The rate of cure exceeds that of conventional accelerators and with the surprising result that scorchiness and overcuring are avoided. At the same time, the physical qualities above-enumerated are obtained, including desirable flatness of cure.

The accelerators of this invention may be obtained in various ways as, for example, the sodium salt of morpholyl dithiocarbamic acid is first prepared by reacting morpholine and sodium hydroxide with carbon disulfide in a flow-type, continuous reactor. The effluent from this reactor is charged into a second reactor with a stream of zinc nitrate dissolved in water. The product is filtered off, washed, dried, and micropulverized.

While the example typifies a "Standard" GR-S rubber, it is to be understood that the accelerator is useful with the various rubbers mentioned in the above patents and publications and blends of this type of rubber with natural rubber and reclaimed natural and synthetic rubber and mixtures thereof, e. g., 80% GR-S and 20% natural rubber or reclaimed rubber. The appended claims are intended to cover GR-S alone or blends thereof.

I claim:

1. The process which comprises vulcanizing a vulcanizable mixture containing a rubbery aqueous emulsion copolymer of styrene and butadiene 1,3, sulfur as a vulcanizing agent, and a heavy metal salt of morpholyl dithionic acid, .05 to 1.5 parts of the metal salt being used per 100 parts of the rubbery copolymer.

2. The process according to claim 1 wherein the heavy metal salt is a zinc salt.

3. The process according to claim 1 wherein the heavy metal salt is an iron salt.

4. The process according to claim 1 wherein the heavy metal salt is a copper salt.

5. A vulcanizate prepared by the process of claim 1.

ARVEL O. FRANZ.

REFERENCES CITED

The following references are of record in the file of this patent:

UNITED STATES PATENTS

| Number | Name | Date |
|---|---|---|
| 1,805,103 | Powers | May 12, 1931 |
| 1,867,982 | Naunton et al. | July 19, 1932 |
| 2,399,947 | Somerville | May 7, 1946 |